(12) United States Patent
Rooholamini et al.

(10) Patent No.: US 7,764,675 B2
(45) Date of Patent: Jul. 27, 2010

(54) PEER-TO-PEER CONNECTION BETWEEN SWITCH FABRIC ENDPOINT NODES

(75) Inventors: Mo Rooholamini, Chandler, AZ (US); Ward McQueen, Chandler, AZ (US); Randeep Kapoor, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 1091 days.

(21) Appl. No.: 11/442,822

(22) Filed: May 30, 2006

(65) Prior Publication Data

US 2007/0280253 A1 Dec. 6, 2007

(51) Int. Cl.
*H04L 12/56* (2006.01)
*G06F 15/16* (2006.01)
*H04L 12/28* (2006.01)

(52) U.S. Cl. ........................ 370/389; 370/255; 370/351; 370/395.2; 370/400; 370/468; 709/220; 709/249; 709/251

(58) Field of Classification Search ......... 370/230–503; 709/203–251
See application file for complete search history.

(56) References Cited

U.S. PATENT DOCUMENTS

| | | | | |
|---|---|---|---|---|
| 5,872,773 | A * | 2/1999 | Katzela et al. | 370/256 |
| 6,574,242 | B1 * | 6/2003 | Keenan et al. | 370/474 |
| 6,788,688 | B2 * | 9/2004 | Trebes, Jr. | 370/395.1 |
| 7,209,991 | B2 * | 4/2007 | Chappell | 710/240 |
| 7,260,661 | B2 * | 8/2007 | Bury et al. | 710/106 |
| 7,287,114 | B2 * | 10/2007 | Sullivan | 710/316 |
| 7,336,623 | B2 * | 2/2008 | Huitema | 370/254 |
| 7,463,890 | B2 * | 12/2008 | Herz et al. | 455/445 |
| 7,493,416 | B2 * | 2/2009 | Pettey | 709/250 |
| 7,502,370 | B2 * | 3/2009 | Pettey | 370/389 |
| 7,512,717 | B2 * | 3/2009 | Pettey | 709/250 |
| 7,522,520 | B2 * | 4/2009 | Griggs | 370/230 |
| 7,522,603 | B2 * | 4/2009 | Vasseur | 370/392 |
| 7,552,242 | B2 * | 6/2009 | DeHaemer et al. | 710/5 |
| 7,617,333 | B2 * | 11/2009 | Pettey | 710/5 |
| 7,649,836 | B2 * | 1/2010 | Griggs | 370/223 |
| 7,664,909 | B2 * | 2/2010 | Pettey | 711/112 |
| 2002/0184358 | A1 * | 12/2002 | Traversat et al. | 709/223 |
| 2004/0230659 | A1 * | 11/2004 | Chase | 709/206 |
| 2005/0270974 | A1 * | 12/2005 | Mayhew | 370/229 |
| 2006/0050632 | A1 * | 3/2006 | Griggs | 370/229 |
| 2006/0050645 | A1 * | 3/2006 | Chappell et al. | 370/252 |
| 2006/0050652 | A1 * | 3/2006 | Chappell et al. | 370/254 |
| 2006/0050693 | A1 * | 3/2006 | Bury et al. | 370/389 |

(Continued)

*Primary Examiner*—Ayaz R Sheikh
*Assistant Examiner*—Venkatesh Haliyur
(74) *Attorney, Agent, or Firm*—Blakely, Sokoloff, Taylor & Zafman LLP

(57) ABSTRACT

A method includes receiving a request from an endpoint node on a switch fabric to establish a peer-to-peer connection with another node on the switch fabric. The peer-to-peer connection is to be used to exchange data with the other node via a path routed through the switch fabric. The path is routed through an intermediary node on the switch fabric. One or more parameters are obtained that enable the endpoint node to exchange data with the other node. The one or more parameters are maintained in a data repository at a given endpoint node on the switch fabric. The implementation also includes establishing the peer-to-peer connection based on the one or more parameters obtained from the data repository and based on a given switch fabric topology.

7 Claims, 8 Drawing Sheets

U.S. PATENT DOCUMENTS

| | | | |
|---|---|---|---|
| 2006/0050694 A1* | 3/2006 | Bury et al. | 370/389 |
| 2006/0050716 A1* | 3/2006 | Griggs | 370/397 |
| 2006/0050722 A1* | 3/2006 | Bury et al. | 370/403 |
| 2006/0050733 A1* | 3/2006 | Chappell et al. | 370/468 |
| 2006/0053240 A1* | 3/2006 | Chappell | 710/240 |
| 2006/0056400 A1* | 3/2006 | Griggs | 370/360 |
| 2006/0067315 A1* | 3/2006 | Tan et al. | 370/389 |
| 2006/0101178 A1* | 5/2006 | Zhong et al. | 710/112 |
| 2006/0120372 A1* | 6/2006 | Bury et al. | 370/392 |
| 2006/0123137 A1* | 6/2006 | DeHaemer et al. | 710/2 |
| 2006/0140126 A1* | 6/2006 | Zhong et al. | 370/241 |
| 2006/0224813 A1* | 10/2006 | Rooholamini et al. | 710/316 |
| 2006/0236017 A1* | 10/2006 | Rooholamini et al. | 710/316 |
| 2007/0070974 A1* | 3/2007 | Rooholamini et al. | 370/351 |
| 2007/0276973 A1* | 11/2007 | Tan et al. | 710/112 |
| 2007/0280253 A1* | 12/2007 | Rooholamini et al. | 370/395.2 |
| 2008/0080400 A1* | 4/2008 | Kapoor et al. | 370/255 |

* cited by examiner

Message Format 510

| | Byte 0 | | | | | | | | Byte 1 | | | | | | | | Byte 2 | | | | | | | | Byte 3 | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| dword 0 | 512 (64:32) ||||||||||||||||||||||||||||||||
| dword 1 | 512 (31:0) ||||||||||||||||||||||||||||||||
| dword 2 | | | | | | | | | | | | | | | | | | | | | | | 514 ||||||| 516 |||||

Table 520

| Code | Message | Description |
|---|---|---|
| 0001 | Create Connection Request | Client requests establishment of a connection with a peer |
| 0010 | Close Connection | Either peer to request closing/taking down the connection |
| 0100 | Pause Connection | Request to pause a connection |
| 1000 | Resume Connection | Ready to resume a previously paused connection |

FIG. 5

PEER-TO-PEER CONNECTION BETWEEN SWITCH FABRIC ENDPOINT NODES

BACKGROUND

In networking environments such as those used in telecommunication and/or data centers, a switch fabric is utilized to rapidly move data. Typically a switch fabric provides a communication medium that includes one or more point-to-point communication links interconnecting one or more nodes (e.g., endpoints, switches, modules, blades, boards, etc.). The switch fabric may operate in compliance with industry standards and/or proprietary specifications. One example of an industry standard is the Advanced Switching Interconnect Core Architecture Specification, Rev. 1.1, published November 2004, or later version of the specification ("the ASI specification"). The ASI specification is available through the ASI special interest group (ASI SIG).

Typically a switch fabric in a telecommunication and/or data center environment includes a switch fabric management architecture to maintain a highly available communication medium and to facilitate the movement of data through the switch fabric. As part of a typical switch fabric management architecture, one or more nodes provide a service to manage/control at least a portion of each node's switch fabric configuration as well as the communication links that interconnect the nodes coupled to the switch fabric (e.g., via spanning tree or fabric ownership). These nodes may be denoted as fabric owners and are well known by the other nodes of the switch fabric. Fabric owners are typically located on an endpoint (e.g., a node coupled to the edge of the switch fabric) with adequate resources to support fabric owner services, e.g., processing power, memory, communication bandwidth, etc.

In addition to a fabric owner service, the switch fabric management architecture also includes various other services to support management activities for elements that process, store and/or forward data through and/or between one or more nodes coupled to a switch fabric. These services, for example, may be hosted by the same endpoints hosting a fabric owner service and/or may be hosted by one or more other endpoints with adequate resources to support or host one or more services. A typical service has its own set of messages which fit the functional requirements of that service and which together form a protocol for interaction with the service. Clients or consumers of a service send a request message to the service and receive a response message from the service.

BRIEF DESCRIPTION OF THE DRAWINGS

FIG. 5 is an example message format to request peer-to-peer services and a table to define a message contained in a field of the message format;

DETAILED DESCRIPTION

Figure 1:
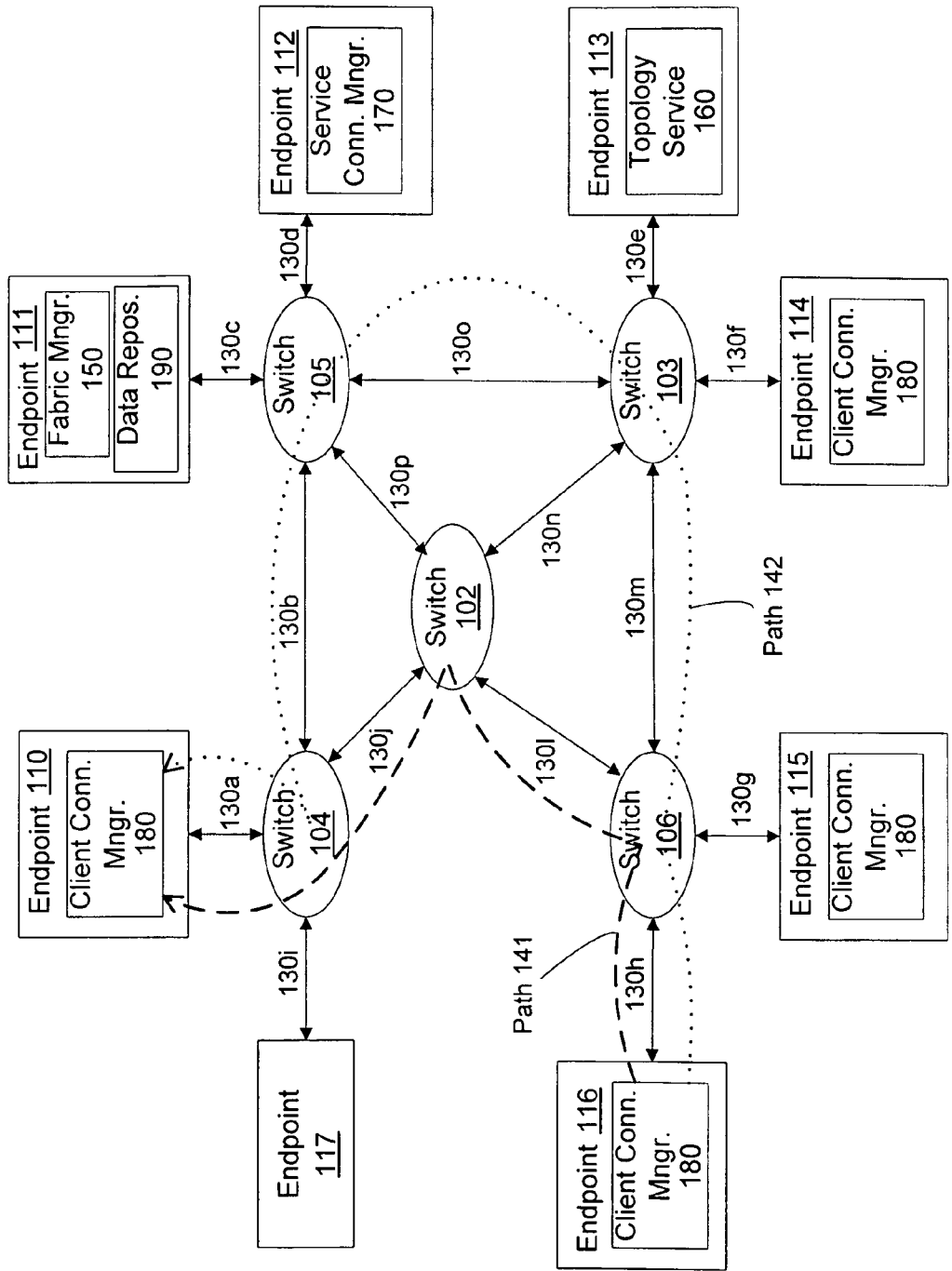
FIG. 1 is an illustration of an example switch fabric.

A typical switch fabric may include one or more well known endpoint nodes to host a switch fabric owner service. Additionally, other endpoint nodes may host services that provide various management functions. In an ASI specification compliant switch fabric, for example, certain services are considered as "base" or "core" services that most applications using a switch fabric require to be present in a switch fabric. The base services are described in a proposed standard associated with the ASI specification and referred to as the "Fabric Management Framework" (the ASI FMF specification). These base services include fabric owner, event, multicast group management and topology services. Additional services described in the proposed ASI FMF specification as "enhanced" services may cover other management functions that are specific to a particular application or use of the switch fabric.

An example of an application or use that may be covered by an enhanced service is a service associated with peer-to-peer connections between endpoint nodes on a switch fabric. A peer-to-peer connection from the perspective of a given endpoint node, for example, is a logical connection that includes an egress port to transmit data via a switch fabric from the given endpoint and a network address associated with a destination peer endpoint node for the data. In one example, the network address is an ingress port on the destination peer endpoint node that is coupled to the switch fabric.

In a switch fabric, for example, data transmitted/received through a peer-to-peer connection between endpoint nodes is routed through an intermediary node (e.g., a switch node) on the switch fabric. The peer-to-peer connection between endpoint nodes on the switch fabric, for example, is used to transmit/receive unicast data, e.g., data exchanged between a single source endpoint node and a single target endpoint node. Various communication protocols may be used to exchange the unicast data through the peer-to-peer connection. One example of a communication protocol that can be used to exchange data is described in a specification associated with the ASI specification. That specification is the Simple Load/Store (SLS) Specification, Rev. 1.1, published December 2004, and/or later versions of the specification ("the SLS specification"). This disclosure is not limited to only SLS communication protocols but may also include other communication protocols to exchange (e.g., transport protocols) data through a peer-to-peer connection, e.g., Ethernet, simple queuing (SQ), etc.

Typically, before data can be exchanged between endpoint nodes via one or more peer-to-peer connections, the peer-to-peer connection needs to be established and maintained. Then after the data is exchanged, the peer-to-peer connection may be closed. When using a communication protocol such as SLS, each endpoint node, for example, is aware of the capabilities (e.g., operating parameters) of the other endpoint node and the topology of the switch fabric to establish and maintain a peer-to-peer connection to exchange data via a path through the switch fabric. Switch fabric topologies may be complex and those topologies may change frequently. Establishing, maintaining and closing peer-to-peer connections in changing topologies is problematic to the rapid exchange of data. Excessive overhead and/or latencies may result from each endpoint node attempting to establish, maintain and close each peer-to-peer connection without the assistance of an enhanced service to manage this process.

In one example, an enhanced service for a switch fabric is implemented that includes receiving a request from an endpoint node on a switch fabric to establish a peer-to-peer connection with another endpoint node on the switch fabric. The peer-to-peer connection, for example, is used to exchange data with the other endpoint node through the peer-to-peer connection and via a path routed through the switch fabric. The path is routed through an intermediary node on the switch fabric. One or more parameters are obtained that enable the endpoint node to exchange data with the other endpoint node (e.g., via an SLS communication protocol). The one or more parameters are maintained in a data repository at a given endpoint node on the switch fabric (e.g., at a fabric owner). The implementation also includes establishing the peer-to-peer connection based on the one or more parameters obtained from the data repository and also based on a given switch fabric topology.

FIG. 1 is an illustration of an example switch fabric 100. As shown in FIG. 1, switch fabric 100 includes various nodes graphically depicted as switches 102-106 and endpoints 110-117. In one example, each of these nodes is coupled to switch fabric 100 with endpoints 110-117 being coupled on the edge or ends of switch fabric 100 and switches 102-106 being coupled within switch fabric 100.

In one example, switch fabric 100 is operated in compliance with the ASI specification, although this disclosure is not limited to only switch fabrics that operate in compliance with the ASI specification. In FIG. 1, endpoint 111 is depicted as hosting a fabric owner service (fabric manager 150). Endpoint 111, for example, includes the resources needed to host a fabric owner service for switch fabric 100, e.g., adequate processing power, memory, communication bandwidth, etc. As a result, endpoint 111 may have been selected/elected as a fabric owner or manager for switch fabric 100. This selection/election, for example, is according to the criteria described in the ASI specification.

In one example, as depicted in FIG. 1, switch fabric 100 includes communication links 130a-p. These communication links include point-to-point communication links that interconnect or couple in communication the nodes (e.g., endpoints 110-117, switches 103-106) of switch fabric 100.

In one implementation, following the selection/election of endpoint node 111 as the host for fabric owner services for switch fabric 100, one or more other endpoint nodes may announce an intent to host one or more services. In one example, any endpoint or combination of endpoints with adequate resources may host or include a service and these services may include base and enhanced services. In one example of an ASI compliant switch fabric 100, base services include fabric owner, event, multicast group management and topology services. This disclosure is not limited to only base services for an ASI-compliant switch fabric but may also include other base or core services that fulfill various management roles/functions for switch fabrics that may operate in compliance with other switch fabric standards or proprietary-based switch fabric specifications.

In one example, an ASI-compliant switch fabric 100 also includes an enhanced service resident on or included in one or more endpoint nodes to establish and possibly manage peer-to-peer connections between endpoint nodes on switch fabric 100. As shown in FIG. 1, for example, endpoint 112 includes service connection logic 170 to provide an enhanced service for peer-to-peer connections.

In one implementation, at least a portion of the endpoint nodes in switch fabric 100 include client connection logic 180. Client connection logic 180, for example, enables these endpoint nodes to interact with endpoint nodes including core and/or enhanced services (e.g., service connection logic 170). For example, as described more below, client connection logic 180 includes features to advertise or announce an endpoint node's capabilities to exchange data using a given communication protocol (e.g., SLS), request a peer-to-peer connection with another endpoint node via a path routed through switch fabric 100 and exchange data through the peer-to-peer connection. As portrayed in FIG. 1, endpoints 110, 114, 115 and 116 may each include client connection logic 180 to interact with service connection logic 170 included in endpoint 112.

In one implementation, a fabric-wide data repository is maintained by and/or located at a well-known or designated element of switch fabric 100. For example, endpoint 111 is well-known via its selection/election as a fabric owner for switch fabric 100. Thus, in this example, the fabric-wide data repository is maintained at endpoint 111 and is shown in FIG. 1 as data repository 190. Data repository 190, for example, is at least a portion of a memory resident on endpoint 111 and/or responsive to endpoint 111.

As described in more detail below, an endpoint node (e.g., endpoint 112) that includes service connection logic 170 may place information in data repository 190 that advertises its services for establishing and managing peer-to-peer connections between endpoint nodes. Endpoint nodes that want to use this service are called, for example, "clients" and these clients may access data repository 190 to determine what endpoint node has advertised that it includes service connection logic 170 and how to request peer-to-peer services from service connection logic 170.

Also as described more below, in one example, endpoint nodes may place information in data repository 190 that advertises or announces their capabilities to exchange data using a given communication protocol. This may include one or more parameters that enable the endpoint nodes to exchange data through a peer-to-peer connection, e.g., unique identification, peer identification, memory locations (e.g., apertures) to receive exchanged data, port configurations, network addresses, etc. Service connection logic 170, for example, may obtain this information from data repository 190 and use these parameters to facilitate the establishment and management of a peer-to-peer connection between endpoint nodes for the endpoint nodes to exchange data.

In one implementation, service connection logic 170 may also establish and manage peer-to-peer connections based on a given topology of switch fabric 100. As mentioned above, one of The base services for an ASI-compliant switch fabric is a topology service. As shown in FIG. 1, endpoint 113 includes or hosts topology service 160.

In one example, a topology service 160 that is hosted by endpoint 113 for an ASI-compliant switch fabric 100 maintains an inventory of the nodes on switch fabric 100 and how these nodes couple or interconnect via communication links 130a-h. Service connection logic 170, for example, is a client to topology service 160. As a client, service connection logic 170 places a request to topology service 160 for topology service 160 to determine a given path between endpoint nodes that is routed through switch fabric 100.

In one implementation, endpoint 116 wishes to establish a peer-to-peer connection with endpoint 110 to exchange data with endpoint 110 (e.g., conduct read/write transactions) through the peer-to-peer connection via a path routed through switch fabric 100. In one example, to establish the peer-to-peer connection, service connection logic 170 in endpoint 112 first obtains one or more parameters previously placed in data repository 190 by endpoints 116 and 110. Service connection logic 170 may also place a request to topology service 160 to obtain a path to route the peer-to-peer connection based on switch fabric 100's topology.

In this implementation, two example paths to route peer-to-peer connections between endpoints 116 and 110 are depicted in FIG. 1 based on switch fabric 100's topology. Path 141, for example, is depicted as a dotted-line that passes through switches 106, 103, 105 and 104, respectively and through communication links 130*h*, 130*m*, 130*o*, 130*b* and 130*a*, respectively. Path 142, for example, is depicted as a dashed-line that passes through switch 106, 102 and 104, respectively and through communication links 130*h*, 130*i*, 130*j* and 130*a*, respectively. Topology service 160 may provide one or both of these paths to service connection logic 170 upon a request for a path between endpoint 116 and 110. Topology service 160 may also suggest which path is the preferred path based on, for example, various switch fabric 100 operating characteristics such as congestion, bandwidths available at each node along a path or reliability of a given path as compared to other paths.

Service connection logic 170, for example, establishes the peer-to-peer connection via path 141 or 142 based on the one or more parameters obtained from data repository 190 for endpoints 116 and 110 and also based on switch fabric 100's topology obtained from topology service 160. Service manager 170 may then notify endpoint 116 that the peer-to-peer connection with endpoint node 110 is established for the endpoints nodes to exchange data through the peer-to-peer connection and via path 141 or 142. Service manager 170, for example, may also manage the peer-to-peer connection by monitoring the topology of switch fabric 100 and may cause the peer-to-peer connection to be routed via another path if the switch fabric topology changes.

Figure 2:
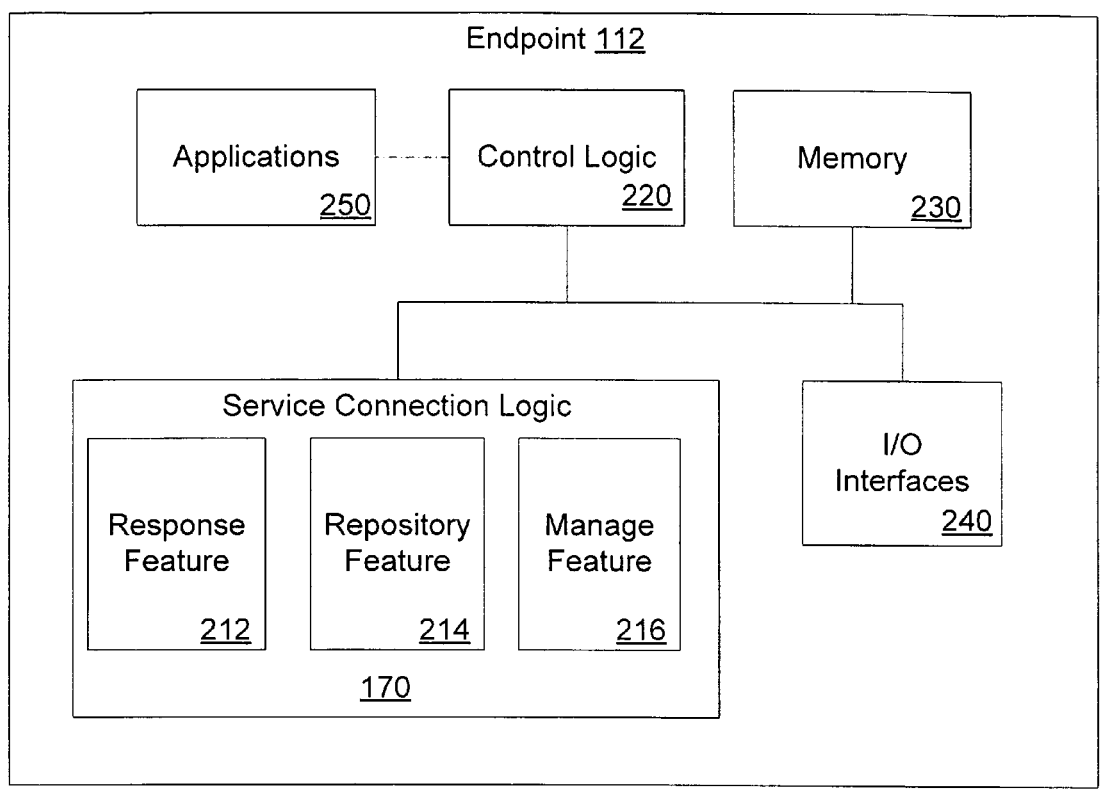
FIG. 2 is a block diagram example architecture for an endpoint node including service connection logic.

FIG. 2 is a block diagram example architecture for endpoint 112 that includes service connection logic 170. In FIG. 2, endpoint nodes 112's architecture is depicted as including service connection logic 170, control logic 220, memory 230, input/output (I/O) interfaces 240, and optionally one or more applications 250, each coupled as depicted.

In one implementation, control logic 220 is a resource resident on endpoint 112 and controls the overall operation of endpoint 112 and may represent any of a wide variety of logic device(s) or executable content an endpoint node allocates to host service connection logic 170. Control logic 220 may be a microprocessor, network processor, microcontroller, field programmable gate array (FPGA), application specific integrated chip (ASIC), or any combination thereof.

In FIG. 2, service connection logic 170 includes response feature 212, repository feature 214 and manage feature 216. In one implementation, service connection logic 170, responsive to control logic 220, receives a request from an endpoint node to establish a peer-to-peer connection with another endpoint node to exchange data through the peer-to-peer connection, establishes the peer-to-peer connection via a path routed through a switch fabric and manages the peer-to-peer connection.

According to one example, memory 230 is used by connection logic 210 to temporarily store information. For example, information that is related to one more parameters for endpoint nodes and that is possibly obtained from a fabric-wide data repository (e.g., data repository 190). Memory 230 may also include encoding/decoding information to facilitate or enable the generation of packet-based messages that are received or transmitted when establishing and managing peer-to-peer connections between endpoint nodes.

I/O interfaces 240 provide a communications interface via a communication medium or link between endpoint 112 and other nodes coupled to or remote to switch fabric 100. As a result, I/O interfaces 240 enable control logic 220 to receive a series of instructions from application software running on a host endpoint node or external to that host endpoint node. The series of instructions may cause control logic 220 to activate control logic 220 to implement one or more features to establish and manage peer-to-peer connections between endpoint nodes on switch fabric 100.

In one example, endpoint 112 includes one or more applications 250 to provide internal instructions to control logic 220. Such applications 250 may be activated to generate a user interface, e.g., a graphical user interface (GUI), to enable administrative features, and the like. For example, a GUI provides a user access to memory 230 to modify or update information to facilitate service connection logic 170's establishing and managing peer-to-peer connections between endpoint nodes on switch fabric 100.

In another example, applications 250 include one or more application interfaces to enable external applications to provide instructions to control logic 220. One such external application could be a GUI as described above.

Figure 3:
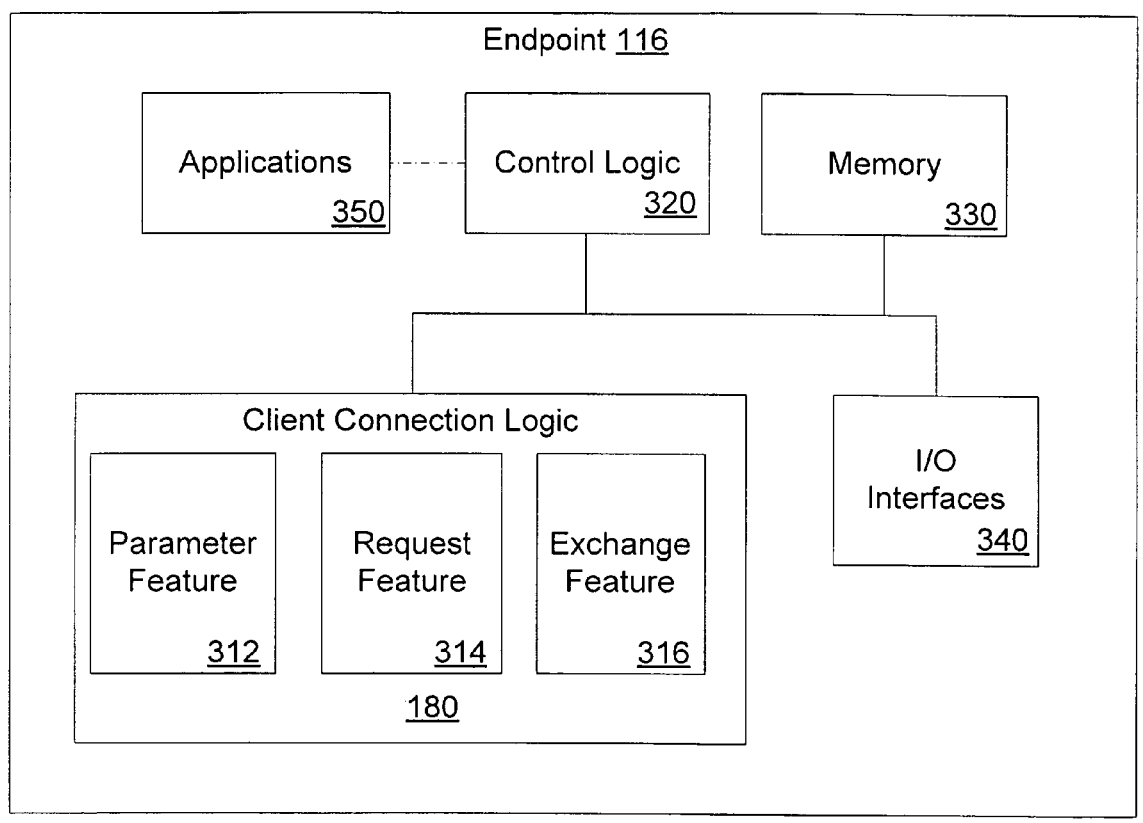
FIG. 3 is a block diagram example architecture an endpoint node including a client connection logic.

FIG. 3 is a block diagram example architecture for endpoint 116 that includes client connection logic 180. In FIG. 2, endpoint nodes 116's architecture is depicted as including client connection logic 180, control logic 320, memory 330, input/output (I/O) interfaces 340, and optionally one or more applications 350, each coupled as depicted.

In one implementation, control logic 320 is a resource resident on endpoint 116 and controls the overall operation of endpoint 116 and may represent any of a wide variety of logic device(s) or executable content an endpoint node allocates to host client connection logic 180. Control logic 320 may be a microprocessor, network processor, microcontroller, FPGA, ASIC, or any combination thereof.

In FIG. 3, client connection logic 180 includes parameter feature 312, request feature 314 and exchange feature 316. In one implementation, these features in client connection logic 180, in response to control logic 320, place or provide one or more parameters to a data repository (e.g. data repository 190) maintained at a endpoint node (e.g., endpoint 111) on switch fabric 100. These features may also request establishment of a peer-to-peer connection with another endpoint node to exchange data through the peer-to-peer connection, and exchanges data with the other endpoint node through an established peer-to-peer connection via a path routed through switch fabric 100.

According to one example, memory 330 is used by client connection logic 180 to temporarily store information. For example, information that is related to one more parameters for an endpoint node that is provided to or placed in a fabric-wide data repository (e.g., data repository 190). Memory 330 may also include encoding/decoding information to facilitate or enable the generation of packet-based messages that are received or transmitted to fabric manager 150 or to service connection logic 170 when requesting an establishment of a peer-to-peer connection with another endpoint node via a path routed through switch fabric 100.

I/O interfaces 340 provide a communications interface via a communication medium or link between endpoint 116 and other nodes coupled to or remote to switch fabric 100. As a result, I/O interfaces 340 enable control logic 320 to receive a series of instructions from application software running on a host endpoint node or external to that host endpoint node. The series of instructions may cause control logic 320 to activate client connection logic 180. Client connection logic 180 may implement one or more features to place parameter information, establish and/or maintain a peer-to-peer connection and exchange data with another endpoint node through the peer-to-peer connection via a path routed through switch fabric 100.

In one example, endpoint 116 includes one or more applications 350 to provide internal instructions to control logic 320. Such applications 350 may be activated to generate a user interface, e.g., a graphical user interface (GUI), to enable administrative features, and the like. For example, a GUI provides a user access to memory 330 to modify or update information to facilitate client connection logic 180's request to service connection logic 170 to establish and maintain peer-to-peer connections with another endpoint node on switch fabric 100.

Figure 4:
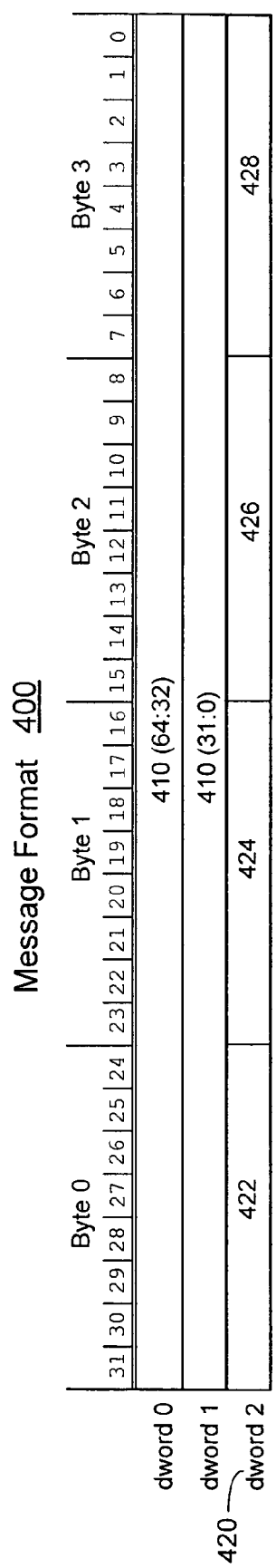
FIG. 4 is an example message format to place parameter information in a switch fabric data repository maintained at an endpoint node on the switch fabric.

In another example, applications 350 include one or more application interfaces to enable external applications to provide instructions to control logic 320. One such external application could be a GUI as described above FIG. 4 is an example message format 400 to place parameter information in data repository 190 maintained at endpoint 111 as depicted in FIG. 1. In one implementation, switch fabric 100 is an ASI-compliant switch fabric. In this implementation, parameter information for endpoint nodes on switch fabric 100 in the format of message format 400 is encapsulated within an ASI route header by an endpoint node (e.g., endpoint 116) and routed to endpoint 111 for placement of the parameter information in data repository 190. Message format 400, for example, includes fields 410 and 420 in double words (dwords) 0-2. In addition, field 420 includes sub-fields 422, 424, 426 and 428.

In one implementation, field 410 includes an endpoint node's unique identifier or serial number. This unique identifier, for example, is a given 64-bit Extended Unique Identifier (EUI) that is associated with an endpoint node and used to identify the endpoint node to other elements coupled to switch fabric 100. In one example, the first 32-bits of the 64-bit EUI are placed in dword 1 and the second 32-bits are placed in dword 0. This identifier may be assigned by the manufacturer of an endpoint node or device or may be assigned by a fabric manager (e.g., fabric manager 150 hosted by endpoint 111).

In one implementation, field 420 includes information associated with parameters to enable an endpoint node to exchange data through a peer-to-peer connection with another endpoint node using a given communication protocol. In one example, sub-field 422 includes information that identifies an endpoint node to other endpoint nodes that can establish peer-to-peer connections (e.g., to conduct read/write transactions) with the endpoint node. For example, endpoint nodes on switch fabric that have placed information in data repository 190 may each have an identification that peers can use to quickly identify that the endpoint node is capable of peer-to-peer communications using a given communication protocol. (e.g., SLS). These nodes, for example, use an endpoint node's identification to request establishment of a peer-to-peer connection with the endpoint node via a path routed through switch fabric 100.

In one example sub-fields 424, 426 and 428 in bytes 0-4 of dword 2 includes information particular to a given protocol. The information contained in these sub-fields is used by service connection logic 170, for example, to establish a peer-to-peer connection and to enable endpoint nodes to exchange data through the established peer-to-peer connection. In one implementation, the given protocol is the SLS communication protocol as described in the SLS specification, although this disclosure is not limited to only the SLS communication protocol for exchanging data via a peer-to-peer connection.

According to the SLS specification, two basic transactions can occur using the SLS communication protocol—a write transaction and a read transaction. An SLS write transaction delivers data from an SLS source (e.g., endpoint node 116) to an SLS target (e.g., endpoint node 110). An SLS read transaction requests data from an SLS target to be delivered to an SLS source. A memory address space which is written to or read from a target endpoint node is referred to in the SLS specification as an aperture and is described by an aperture number and an offset into the aperture.

In one example, when using the SLS communication protocol, the endpoint nodes on switch fabric 100 can indicate support for up to 4096 apertures. Thus, in this example, sub-field 424 may indicate the number of apertures an endpoint node has available for exchanging data through a peer-to-peer connection. This disclosure is not limited to only endpoint nodes that can support up to 4096 but may include endpoint nodes that can support any number of apertures.

In one example, sub-field 426 includes an aperture index value. The aperture index value in sub-field 426, for example, is used to select an aperture table and an entry within the aperture table. This aperture table may include physical or virtual memory addresses associated with a given aperture for an endpoint node. In one implementation, service connection logic 170 may use the aperture index value to locate information about the given aperture to enable service connection logic 170 to establish a peer-to-peer connection with another endpoint node.

In one example, sub-field 428 includes an aperture index for synchronization. In one example, in an SLS communication protocol implementation, for a request from a source endpoint node to a target endpoint node, sub-field 428 includes an aperture via which the source endpoint node receives acknowledgements from the target endpoint node. This is used, for example, for synchronization and reduces the chance that data is incorrectly/mistakenly overwritten in the target endpoint node.

FIG. 5 is an example message format 510 to request peer-to-peer services and a table 520 to define example messages included in field 516 of the message format. In one implementation, switch fabric 100 is an ASI-compliant switch fabric. In this implementation, a request by client connection logic 180 hosted in an endpoint node on switch fabric 100 is made to service connection logic 170 in the format of message format 510. This request, for example, is encapsulated within an ASI route header by an endpoint node (e.g., endpoint 116) and routed to endpoint 112. Message format 510, for example, includes fields 512, 514 and 516 in double words (dwords) 0-2.

In one example, field 512 includes an endpoint node's unique identifier or serial number. As described above for message format 400, this unique identifier, for example, is the same 64-bit EUI that was placed in data repository 190 and is used to identify the endpoint node to service connection logic 170 and for service connection logic 170 to use to locate that endpoint node's parameters maintained in data repository 190.

In one example, field 514 includes peer identification information for the endpoint node on switch fabric 100 that the endpoint node making the request wishes to establish a peer-to-peer connection with. In one example, an endpoint node may query data repository 190 (e.g., at endpoint 111) to gather information on one or more other endpoint nodes that have placed peer-to-peer connection parameters in data repository 190. This gathered information, for example, includes the peer identification information for these one or more other endpoint nodes. An endpoint node may select one of these endpoint nodes and place that endpoint nodes peer identification information in field 514 when making a peer-to-peer connection request to service connection logic 170.

In one implementation, field 516 includes message information for an endpoint node to make requests to service connection logic 170. Examples of messages that an endpoint node may place in field 516 by selectively asserting bits (depicted as binary digit 1) in that field are portrayed in table 520. The binary codes associated with these messages are also portrayed in table 520. This disclosure is not limited to only binary codes for messages.

Figure 6:
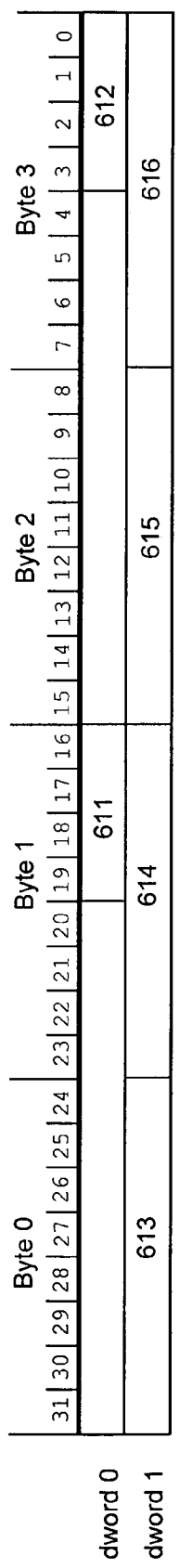
FIG. 6 is an example message format to establish and manage peer-to-peer connections and a table to define a message included in a field of the message format.

FIG. 6 is an example message format 610 to establish and manage peer-to-peer connections and a table 620 to define a message included in field 612 of the message format. As stated above for FIG. 5, for example, switch fabric 100 is an ASI-compliant switch fabric. In one implementation, messages sent to endpoint node clients by service connection logic 170 to establish and manage peer-to-peer connections are in the format of message format 610. These messages, for example, are encapsulated within an ASI route header by an endpoint node (e.g., endpoint 112) and routed to endpoint nodes on switch fabric 100. Message format 610, for example, includes fields 611-612 in dword 0 and fields 613-616 in dword 1.

In one example, field 611 includes path information for routing a peer-to-peer connection between endpoint nodes on a switch fabric. This path information, as described more below, may be obtained from a topology service (e.g., topology service 160) hosted by an endpoint node on the switch fabric (e.g., endpoint 113).

In one example, field 612 includes message information for establishing and/or managing a peer-to-peer connection. Examples of messages that service connection logic 170 may place in field 612 by selectively asserting bits in that field are depicted in table 620. The binary codes associated with these messages are also portrayed in table 620.

Figure 7:
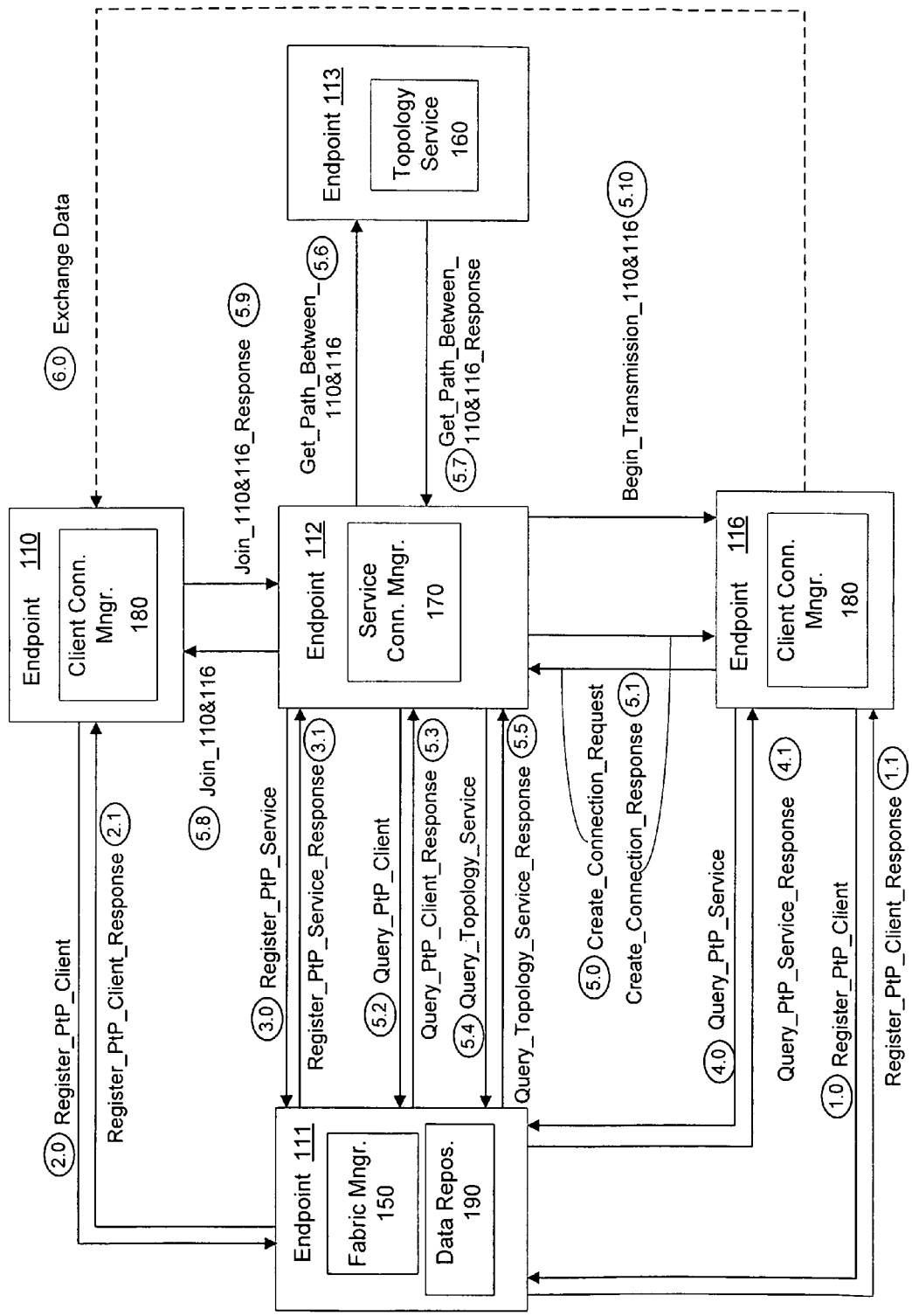
FIG. 7 is a diagram of an example process to establish a peer-to-peer connection between endpoint nodes on a switch fabric.

In one example, fields 613-616 may include parameter information obtained from a data repository for a switch fabric, e.g., data repository 190. The parameter information, for example, may be the same parameter information placed in field 420 by endpoint nodes using message format 400. For example, the information in fields 613-616 is the parameter information for an endpoint node that placed a request to establish a peer-to-peer connection with another node FIG. 7 is a diagram of an example process to establish a peer-to-peer connection between endpoint 116 and endpoint 110 on switch fabric 100. In the diagram depicted in FIG. 7, arrows show the direction of messages, labels identify the types of messages, and the numbered circles show an example order of message generation by various elements of switch fabric 100. A message number X.0 indicates the initial message and a message numbered X.1 to X.n shows the subsequent messages generated as a result of that initial message.

In one example, endpoint 116 wishes to establish a peer-to-peer connection with endpoint 110. In one implementation, before the actual request to create the peer-to-peer connection, client connection logic 180 included in endpoint 116 and client connection logic 180 included in endpoint 110 may each activate their respective parameter feature 312 to generate a message in the format of message format 400 to place parameter information in data repository 190. In one example, these messages are depicted as "Register_PtP_Client" at circles 1.0 and 2.0. The corresponding response messages, for example, are associated with circles 1.1 and 2.1 and are depicted as "Register_PtP_Client_Response." Each response, for example, is generated by fabric manager 150 and each response may indicate to each endpoint node whether its parameter information (e.g., information included in field 420 of message format 400) was properly stored in data repository 190.

In one example, endpoint 112 includes service connection logic 170 and advertises its ability to provide peer-to-peer services for switch fabric 100. For example, at circle 3.0 a "Register_PtP_Service" message is sent to endpoint 111 so that fabric manager 150 can place that advertisement in data repository 190. Fabric manager 150, for example, generates a "Register_PtP_Service_Response" message to indicate whether that advertisement was properly stored in data repository 190.

In one example, client connection logic 180 included in endpoint 116 at circle 4.0 generates a "Query_PtP_Service" message to query data repository 190 to determine what endpoint nodes include service connection logic 170. A response message denoted as "Query_PtP_Service_Response," at circle 4.0 may return information that enables client connection logic 180 included in endpoint 116 to identify endpoint 112 as including service connection logic 170. The response message, in one example, may also include peer identification information for endpoint nodes (e.g., endpoint 110) on switch fabric 100 that have also placed parameter information in data repository 190.

In one implementation, once the client connection logic 180 included in endpoint 116 has identified that endpoint node 112 includes service connection logic 170, request feature 314 is activated. Request feature 314, for example, generates a message in the format of message format 510 to make a request to service connection logic 170 to establish a peer-to-peer connection with endpoint 110. Request feature 314, for example, places the peer identification information in field 514 that is associated with endpoint 110 and that was gathered from data repository 190 at circle 4.1. Request feature 314, for example, also asserts only bit 0 in field 516 to indicate it wants to establish a peer-to-peer connection. This message is represented at circle 5.0 as "Create_Connection_Request." Service connection logic 170 activates response feature 212 and an associated response message to this request, for example, is respesented at circle 5.1 as "Create_Connection_Request_Response."

At circle 5.2, in one example, service connection logic 170 activates repository feature 214 to place a query to obtain parameter information for endpoints 110 and 116 from data repository 190. This query is portrayed as a "Query_PtP_Client" message. At circle 5.3 and portrayed by the "Query_PtP_Client_Response" message, for example, fabric manager 150 provides the parameter information to repository feature 214. This parameter information, for example, includes the parameter information placed by the client connection logics 180 included in endpoints 116 and 110 at circles 1.0 and 2.0, respectively. This parameter information may be temporarily stored in a memory (e.g., memory 230).

At circle 5.4, in one example, repository feature 214 places a query to obtain information to determine what endpoint node(s) on switch fabric 100 are hosting topology service 160. This is shown as a "Query_Topology_Service" message. Fabric manager 150 may obtain this information from data repository 190 and a message shown at circle 5.5 as "Query_Topology_Service_Response" may include information that indicates endpoint 113 is hosting topology service 160.

At circle 5.6, in one example, service connection logic 170 activates manage feature 216 to make a request to topology service 160 hosted by endpoint 113 to obtain a path for a peer-to-peer connection between endpoint 116 and endpoint 110. This message is portrayed as "Get_Path_Between_110&116." In one example, the topology depicted in FIG. 1 for switch fabric 100 is the topology that topology service 160 bases it path on. For example, path 141 is the shortest route between endpoints 116 and 110. Thus, topology service 160 at circle 5.7 provides path 141 information to manage feature 216 and this message is shown as a "Get_Path_Between_110&116_Response" message.

At circle 5.8, in one example, manage feature 216 of service connection logic 170 generates a message in the format of message format 610. This message is represented in FIG. 7 as "Join_110&116." Thus, for example, as table 620 for FIG. 6 shows, manage feature 216 does not assert any bits in field 612 to generate a join request message. Manage feature 216, for example, places the parameter information for endpoint 116 in fields 613-616 of dword 1. At circle 5.9 client connection logic 180 that is included in endpoint 110 generates a response indicating whether it is willing or able to join with endpoint 116. This is shown as "Joint_110&116_Response" in FIG. 7. If willing and able, for example, the client connection logic 180 included in endpoint 110 may activate exchange feature 316 to temporarily store (e.g., in memory 330) the parameter information that was in fields 613-616 in order to prepare endpoint node 110 for exchanging data with endpoint 116.

At circle 5.10, in one example, manage feature 216 of service connection logic 170 generates a message in the format of message format 610. This message is portrayed in FIG. 7 as "Begin_Transmission_110&116." As table 620 in FIG. 6 shows, for example, manage feature 216 asserts only bit 1 in field 612 to generate at least part of a begin transmission message. This begin transmission message, for example, serves as an indication that a peer-to-peer connection is established and data can now be exchanged through the peer-to-peer connection via the path obtained at circles 5.6 and 5.7 and included in field 611. Manage feature 216 may also place the parameter information for endpoint 110 in fields 613-616 to facilitate the exchange of data which includes, for example, SLS read/write transactions.

At circle 6.0, in one example, client connection logic 180 included in endpoint 116 uses endpoint 110's parameter information as well as the path information to begin the exchange of data. For example, endpoint 116 uses that information to place either an SLS write transaction or an SLS read transaction to endpoint 110 through the peer-to-peer connection established via path 141.

In one example, either endpoint 110 or endpoint 116 may want to close or temporarily pause the peer-to-peer connection via path 141. In this example, client connection logic 180 included in endpoint 110 or endpoint 116 causes request feature 314 to generate a message in the format of message format 510. Request feature 314, for example, uses the code in table 520 and asserts bit 1 in field 516 to indicate a request to close the connection or asserts bit 2 to indicate a request to pause the connection. Fields 512 and 514 are populated by request feature 314 as described above and the close or pause message is sent to service connection logic 170 included in endpoint 112.

In one example, in response to receipt of a close or pause connection message, manage feature 216 of service connection logic 170 generates a message in the format of message format 610. Manage feature 216, for example, uses the code in table 620 and asserts bit 1 in field 612 to indicate to the other endpoint node to close the peer-to-peer connection or asserts bit 3 in field 612 to indicate a pause to the peer-to-peer connection. Fields 611, for example, is populated by manage feature 216 with path information as described above. In one example, since the peer-to-peer connection is already established, fields 613-616 in dword 1 are not populated or used for a close or pause message. The message is then sent to the other endpoint node to notify the other endpoint node to pause or close the peer-to-peer connection.

In one example, either endpoint 110 or endpoint 116 may want to resume the exchange of data through a paused peer-to-peer connection. Request feature 314, for example, uses the code in table 520 and asserts bit 3 in field 516 to indicate a request to resume the peer-to-peer connection. Fields 512 and 514 are populated by request feature 314 as described above and the resume message is sent to service connection logic 170 that is included in endpoint 112. Manager 216 of service connection logic 170, for example, generates a resume message in the format of message format 610. Manage feature 216, for example, uses the code in table 620 and asserts bit 2 in field 612 to indicate to the other endpoint node to resume the peer-to-peer connection. Similar to a close or pause message, for example, the fields in dword 1 are not used for a resume message. The message is then sent to the other endpoint node to notify the other endpoint node to resume the peer-to-peer connection.

In one implementation, the topology of switch fabric 100 may change such that path 141 for the peer-to-peer connection between endpoints 110 and 116 is no longer functional or adequate to maintain the peer-to-peer connection. For example, a communication link goes down or a node in path 141 is removed or malfunctions. Referring to switch fabric 100 as depicted in FIG. 1, in one example, switch 102 malfunctions and/or is removed from switch fabric 100. This break in path 141, for example, causes manage feature 216 of service connection logic 170 to place a query to topology service 160 to determine a new path to update the path for the peer-to-peer connection between endpoints 110 and 116. Topology service 160, for example, may indicate to manage feature 216 that path 142 is an option that can route the peer-to-peer connection without going through switch 102. Manage feature 216, for example, generates a message in the format of message format 610 and asserts both bit 0 and bit 3 in field 612 to indicate a path update and also includes the updated path information in field 611. This path update message is then sent to endpoints 110 and 116 to notify these endpoints that the path has changed and to use the updated path 142 for their peer-to-peer connection.

Figure 8:
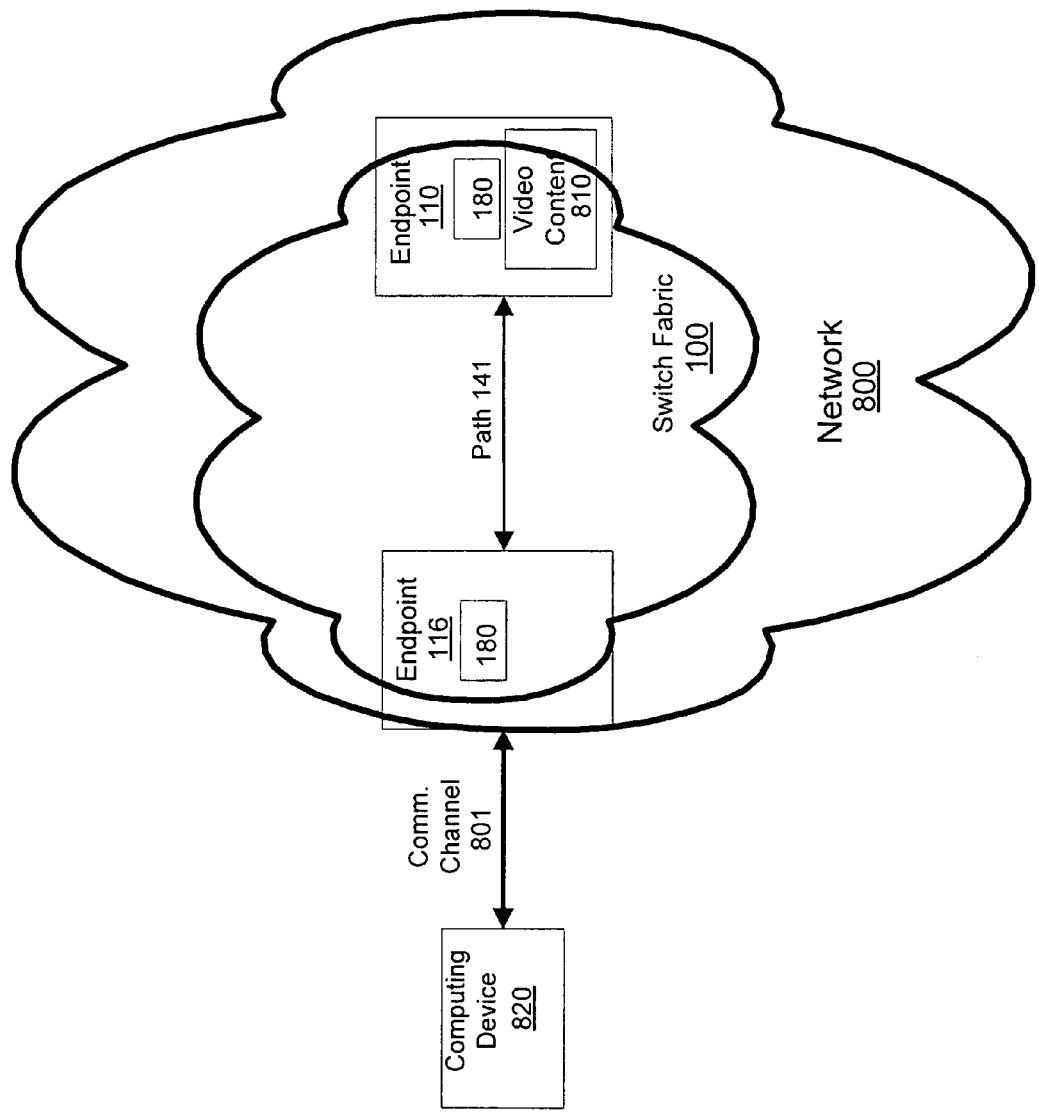
FIG. 8 is an illustration of an example endpoint node on a switch fabric coupled to a computing platform to send video content to the computing platform.

FIG. 8 is an illustration of endpoint 116 on switch fabric 100 coupled to computing platform 820 to stream or send video content to computing platform 820. In one example, as portrayed in FIG. 8, endpoints 116 and 110 on switch fabric 100 are part of communication network 800. Communication network 800 may include but is not limited to a wired or a wireless local area network (LAN/WLAN), a wide area network (WAN/WWAN), a metropolitan area network (MAN), a personal area network (PAN) and a cellular or a wireless broadband telephony network. FIG. 8 also portrays computing system 820 coupling to communication network 800 via endpoint 116. Computing system 820 may include but is not limited to a desktop computer, a laptop computer, a notebook computer, a server, a digital broadband telephony device, a digital home network device (e.g., cable/satellite/set top box, etc.), a personal digital assistant (PDA) and the like.

In one implementation, computing system 820 is coupled to endpoint 116 via communication channel 801. Communication channel 801, for example, includes wired and/or wireless communication links maintained, for example, by a cable, satellite or telecommunications provider. In this implementation, endpoint 116 may be an access node for communication network 800 and computing system 820 may be a customer to an Internet Service Provider or other type of network service provider. Computing system 820 may want to obtain a full-length movie selected from a library of movies. The library of movies may be stored or maintained at endpoint 110 and is shown in FIG. 8 as video content 810.

In one example, based on a computing system 820's request for video content in video content 810, endpoint 116 establishes a peer-to-peer connection via path 141 with endpoint 110 as described above for FIG. 7. Endpoint 116 obtains the video content through the peer-to-peer connection via path 141. The video content is then sent or streamed to computing system 820 via communication channel 801.

Referring again to memory 230 and 330 in FIG. 2 and FIG. 3. Memory 230 or 330 may include a wide variety of memory media including but not limited to volatile memory, non-volatile memory, flash, programmable variables or states, random access memory (RAM), electronic erasable programmable read-only memory (EEPROM), flash, or other static or dynamic storage media. In one example, machine-readable instructions can be provided to memory 230 or 330 from a form of machine-accessible medium. A machine-accessible medium may represent any mechanism that provides (i.e., stores and/or transmits) information in a form readable by a machine (e.g., an ASIC, special function controller or processor, FPGA, endpoint node or other hardware device). For example, a machine-accessible medium may include: read-only memory (ROM); EEPROM; RAM; magnetic disk storage media; optical storage media; flash memory devices; and the like.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in this regard.

What is claimed is:

1. A method comprising:
   at a first server endpoint node on a switch fabric, receiving a request from a first client endpoint node on the switch fabric, the request to establish a peer-to-peer connection with a second client endpoint node on the switch fabric to exchange data with the second client endpoint node through the peer-to-peer connection, wherein the switch fabric comprises the switch fabric to operate in compliance with an Advanced Switching Interconnect specification to include Advanced Switching Interconnect Core Architecture Specification, Revision 1.1, wherein to exchange data with the second client endpoint node through the peer-to-peer connection comprises exchanging data using Simple Load/Store communication protocols in accordance with another Advanced Switching Interconnect specification to include Simple Load/Store Specification, Revision 1.1;
   in response to receiving the request,
      the first server endpoint node obtaining from a management node on the switch fabric one or more parameters to enable the first client endpoint node to exchange data with the second client endpoint node, the one or more parameters maintained in a data repository at the management endpoint node, wherein the one or more parameters to enable the first client endpoint node to exchange data with the second client endpoint node includes a peer-to-peer identifier for the first client endpoint node, the number of apertures the second client endpoint node has available for Simple Load/Store transactions, an aperture index value to select an aperture table and an aperture index for synchronization, and
      the first server endpoint node retrieving from a second server endpoint node on the switch fabric data specifying a path on the switch fabric, the path including an intermediary node on the switch fabric;
   based on the one or more parameters and the data specifying the path, the first server endpoint node establishing the peer-to-peer connection; and
   after establishing the peer-to-peer connection, the first server endpoint node sending a message notifying the first client endpoint node that the peer-to-peer connection is established for the first client endpoint node to exchange data with the second client, where the first client endpoint node responds to the message by sending an initial transmission via the path to the second client endpoint node.

2. A method according to claim 1, further comprising:
   updating the path routed through the switch fabric to another path routed through the switch fabric based, at least in part, on a change in the given switch fabric topology, the other path routed through another intermediary node on the switch fabric; and
   notifying both the first client endpoint node and the second client endpoint node that the peer-to-peer connection is to be routed via the other path.

3. A method according to claim 1, further comprising:
   receiving a close request from the first client endpoint node to close the peer-to-peer connection; and
   notifying the second client endpoint node to close the peer-to-peer connection.

4. A method according to claim 1, further comprising:
   receiving a pause request from the first client endpoint node to pause the peer-to-peer connection;
   notifying the second client endpoint node to pause the peer-to-peer connection;
   receiving a resume request from the first client endpoint node to resume the peer-to-peer connection; and
   notifying the other endpoint to resume the peer-to-peer connection to exchange data through the peer-to-peer connection via the path routed through the switch fabric.

5. A method according to claim 1, wherein exchanging data using Simple Load/Store communication protocols comprises the first client endpoint node implementing a Simple Load/Store write transaction with the second client endpoint node.

6. An apparatus comprising:
   a first client endpoint node on a switch fabric, the first client endpoint node including logic to:
      generate a request to a switch fabric service hosted on a first server endpoint node, the request to establish a peer-to-peer connection with a second client endpoint node on the switch fabric to exchange data with the second client endpoint node through the peer-to-peer connection, wherein the switch fabric comprises the switch fabric to operate in compliance with an Advanced Switching Interconnect specification to include Advanced Switching Interconnect Core Architecture Specification, Revision 1.1, wherein to exchange data with the second client endpoint node through the peer-to-peer connection comprises exchanging data using Simple Load/Store communication protocols in accordance with another Advanced Switching Interconnect specification to include Simple Load/Store Specification, Revision 1.1, where, in response to the request, the first server endpoint node establishes the peer-to-peer connection based on:
    one or more parameters obtained by the first server endpoint node from a management node on the switch fabric, the one or more parameters to enable the first client endpoint node to exchange data with the second client endpoint node, wherein the one or more parameters to enable the first client endpoint node to exchange data with the second client endpoint node includes a peer-to-peer identifier for the first client endpoint node, the number of apertures the second client endpoint node has available for Simple Load/Store transactions, an aperture index value to select an aperture table and an aperture index for synchronization, and
    data retrieved by the first server endpoint node from a second server endpoint node on the switch fabric, the retrieved data specifying a path on the switch fabric, the path including an intermediary node on the switch fabric;
receive from the first server endpoint node notification that the peer-to-peer connection has been established with the other endpoint node; and
based on the notification, send an initial transmission via the path to the second client endpoint node.

7. A non-transitory computer-readable medium embodying computer-readable instructions, which, when executed by a first server endpoint node on a switch fabric causes the first server endpoint node to:
receive a request from a first client endpoint node on the switch fabric, the request to establish a peer-to-peer connection with a second client endpoint node on the switch fabric to exchange data with the second client endpoint node through the peer-to-peer connection, wherein the switch fabric operates in compliance with an Advanced Switching Interconnect specification to include Advanced Switching Interconnect Core Architecture Specification, Revision 1.1, wherein to exchange data with the second client endpoint node through the peer-to-peer connection comprises exchanging data using Simple Load/Store communication protocols in accordance with another Advanced Switching Interconnect specification to include Simple Load/Store Specification, Revision 1.1;
in response to the request,
    obtain one or more parameters from a management node on the switch fabric, the one or more parameters to enable the first client endpoint node to exchange data with the second client endpoint node, the one or more parameters maintained in a data repository at the management endpoint node, wherein the one or more parameters to enable the first client endpoint node to exchange data with the second client endpoint node includes a peer-to-peer identifier for the first client endpoint node, the number of apertures the second client endpoint node has available for Simple Load/Store transactions, an aperture index value to select an aperture table and an aperture index for synchronization, and
    retrieve data from a second server endpoint node on the switch fabric, the data specifying a path on the switch fabric, the path including an intermediary node on the switch fabric;
based on the one or more parameters and the data specifying the path, establish the peer-to-peer connection with the first server endpoint node; and
send a message after establishing the peer-to-peer connection, the message notifying the first client endpoint node that the peer-to-peer connection is established for the first client endpoint node to exchange data with the second client, where the first client endpoint node responds to the message by sending an initial transmission via the path to the second client endpoint node.

* * * * *